US012782157B2

(12) United States Patent
Fei et al.

(10) Patent No.: US 12,782,157 B2
(45) Date of Patent: Nov. 3, 2026

(54) HIGH-DEFINITION MAP UPDATE METHOD AND APPARATUS

(71) Applicant: Yinwang Intelligent Technologies Co., Ltd., Shenzhen (CN)

(72) Inventors: Wenkai Fei, Beijing (CN); Jianqin Liu, Beijing (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 323 days.

(21) Appl. No.: 18/344,268

(22) Filed: Jun. 29, 2023

(65) Prior Publication Data

US 2023/0349715 A1 Nov. 2, 2023

Related U.S. Application Data

(63) Continuation of application No. PCT/CN2021/132865, filed on Nov. 24, 2021.

(30) Foreign Application Priority Data

Dec. 31, 2020 (CN) ........................ 202011638322.0

(51) Int. Cl.

*G05D 1/00* (2024.01)
*G01C 21/00* (2006.01)
*G06F 18/23213* (2023.01)

(52) U.S. Cl.

CPC ... *G01C 21/3807* (2020.08); *G06F 18/23213* (2023.01)

(58) Field of Classification Search

CPC .................................................. G01C 21/3807
See application file for complete search history.

(56) References Cited

U.S. PATENT DOCUMENTS

| | | | | |
|---|---|---|---|---|
| 10,332,020 B2 * | 6/2019 | Bai | G07C 5/02 |
| 10,657,807 B1 * | 5/2020 | Sheynman | G08G 1/0112 |
| 10,872,381 B1 * | 12/2020 | Leise | H04W 4/40 |
| 2015/0287321 A1 * | 10/2015 | Krompass | G01C 21/26 701/117 |

(Continued)

FOREIGN PATENT DOCUMENTS

| | | | |
|---|---|---|---|
| CN | 108344414 A | 7/2018 | |
| CN | 109766405 A | 5/2019 | |
| WO | WO-2020045318 A1 * | 3/2020 | G01C 21/26 |

OTHER PUBLICATIONS

Navigation Data Standard Location Documentation FTX version 2.2, 2020, 40 pages.

*Primary Examiner* — Ellis B. Ramirez
*Assistant Examiner* — Paul W Arellano
(74) *Attorney, Agent, or Firm* — Conley Rose, P.C.

(57) ABSTRACT

A high-definition map update method includes obtaining n-dimensional feature information of a dynamic event in n dimensions, where the n dimensions are n factors that affect representation of the dynamic event in a high-definition map, the dynamic event is an event that causes dynamic information in the high-definition map to change, and n is an integer greater than one, and determining, based on the feature information, a representation manner of the dynamic event in the high-definition map, where the representation manner includes at least one of an extended attribute representation manner or a dynamic layer representation manner.

20 Claims, 4 Drawing Sheets

(56) References Cited

U.S. PATENT DOCUMENTS

| | | | | |
|---|---|---|---|---|
| 2018/0113892 | A1* | 4/2018 | Nakata | G06F 16/2272 |
| 2019/0204095 | A1* | 7/2019 | Anderson | G01C 21/3407 |
| 2020/0051621 | A1* | 2/2020 | Papandreou | G11C 16/26 |
| 2020/0196105 | A1* | 6/2020 | Hunter | G08B 21/0261 |
| 2020/0202617 | A1* | 6/2020 | Lachinski | H04N 13/204 |

* cited by examiner

HIGH-DEFINITION MAP UPDATE METHOD AND APPARATUS

CROSS-REFERENCE TO RELATED APPLICATIONS

This is a continuation of International Patent Application No. PCT/CN2021/132865 filed on Nov. 24, 2021, which claims priority to Chinese Patent Application No. 202011638322.0 filed on Dec. 31, 2020. The disclosures of the aforementioned applications are hereby incorporated by reference in their entireties.

TECHNICAL FIELD

This disclosure relates to the field of intelligent connected vehicle technologies, and in particular, to a high-definition map update method and apparatus.

BACKGROUND

As one of key capabilities to implement autonomous driving, a high-definition map will be an effective supplement to an existing sensor for autonomous driving, and provides a more reliable sensing capability for a vehicle. Compared with a conventional navigation map, the high-definition map serving autonomous driving has higher requirements in all aspects, and can cooperate with a sensor and an algorithm to support decision-making.

In an autonomous driving process, an external environment may dynamically change, affecting traveling of the vehicle. Therefore, in addition to a static layer, the high-definition map has an increasing demand for more dynamic information, to meet a development requirement of the transportation field. The dynamic information includes a large amount of information, for example, real-time traffic flow information, road occupation information, traffic control information, a signal light status, and collaborative driving information. If the information can be accurately updated in the high-definition map, timely road information, driving suggestions, risk warning, and the like can be provided for the vehicle and the like, to efficiently improve safety of autonomous driving. However, there is no uniform industry standard and implementation product for updating the dynamic information in the high-definition map.

In conclusion, how to provide a feasible and effective dynamic event update method for the high-definition map to better update the high-definition map is a technical problem that needs to be resolved by persons skilled in the art.

SUMMARY

This disclosure provides a high-definition map update method and apparatus, and can provide a feasible and effective high-definition map update method, to improve event updating of a high-definition map, and improve accuracy of the event representation of the high-definition map, so as to better update the high-definition map.

According to a first aspect, this disclosure provides a high-definition map updating method, where the method includes the following steps: a map update apparatus obtains n-dimensional feature information of a dynamic event in n dimensions, where the n dimensions are n factors that affect representation of the dynamic event in a high-definition map, the dynamic event is an event that causes dynamic information in the high-definition map to change, and n is an integer greater than one, the map update apparatus determines, based on the n-dimensional feature information, a representation manner of the dynamic event in the high-definition map, where the representation manner includes at least one of an extended attribute representation manner or a dynamic layer representation manner, the extended attribute representation manner is a representation manner of associating the dynamic event with a static layer in the high-definition map, and using the dynamic event as an extended attribute of a static layer element, and the dynamic layer representation manner is a manner of adding the dynamic event to a dynamic layer in the high-definition map for updating, where optionally, the dynamic layer and the static layer in the high-definition map are associated with each other, and the map update apparatus represents the dynamic event in the high-definition map based on the determined representation manner of the dynamic event.

In this disclosure, the representation manner of the dynamic event in the high-definition map is evaluated from a plurality of dimensions, so that a representation manner of each dynamic event can be accurately determined, and automatic processing is easily implemented. Compared with the conventional technology, this disclosure provides a feasible and effective high-definition map update method. Thus, event updating of the high-definition map is improved, and accuracy and automation of the event representation of the high-definition map are improved to better and efficiently update the high-definition map.

In a possible implementation, the n dimensions include at least one of the following dimensions, an update frequency of a dynamic event status, an occurrence probability of an event, a degree of impact of an event on a topology of the high-definition map, a degree of an association change of an event, reusability of geometric representation of an event for the static layer, or a degree of independence of an event from the static layer.

For example, this disclosure provides several considered dimensions used to evaluate the representation manner of the dynamic event in the high-definition map, and the representation manner of the dynamic event can be accurately and properly determined from at least one of these dimensions.

In a possible implementation, when the dynamic event includes a plurality of dynamic events, that a map update apparatus obtains n-dimensional feature information of a dynamic event in n dimensions includes: the map update apparatus obtains n-dimensional feature information of the plurality of dynamic events in the n dimensions, and that the map update apparatus determines, based on the n-dimensional feature information, a representation manner of the dynamic event in the high-definition map includes: the map update apparatus determines, based on the n-dimensional feature information of the plurality of dynamic events in the n dimensions by using a clustering algorithm, representation manners of the plurality of dynamic events in the high-definition map.

In this disclosure, the clustering algorithm may be used to classify various dynamic events based on the foregoing described considered dimensions, so that a representation manner of the dynamic event of each type obtained through classification can be determined. Calculation by using the clustering algorithm can improve calculation efficiency, and can also improve accuracy of dynamic event classification. Thus, accuracy of the representation manner of the dynamic event is improved.

In a possible implementation, determining, by using a clustering algorithm, representation manners of the plurality of dynamic events in the high-definition map includes: the map update apparatus classifies, by using the clustering algorithm, the plurality of dynamic events to obtain a first-type dynamic event and a second-type dynamic event, and in a case of determining, through analysis based on n-dimensional feature information of the first-type dynamic event and n-dimensional feature information of the second-type dynamic event, that a degree of association between the first-type dynamic event and the static layer in the high-definition map is greater than a degree of association between the second-type dynamic event and the static layer in the high-definition map, the map update apparatus classifies the first-type dynamic event as an event described in the extended attribute representation manner, and classifies the second-type dynamic event as an event described in the dynamic layer representation manner.

In this disclosure, after the dynamic events are classified into two types, a representation manner of the dynamic event of each type may be determined based on a value of the degree of association between the two types of events and the static layer in the high-definition map, so that accuracy of the representation manner of the dynamic event can be improved. It should be noted that the degree of association between the dynamic event and the static layer in the high-definition map indicates impact of updating of the dynamic event in the high-definition map on the static layer. A greater degree of association indicates more impact, and a smaller degree of association indicates less impact. That is, the impact is in positive coloration with the degree of association.

In a possible implementation, when the dynamic event includes a first dynamic event, that the map update apparatus determines, based on the n-dimensional feature information, a representation manner of the dynamic event in the high-definition map includes: the map update apparatus determines a determining result of a representation manner of the first dynamic event in each single dimension based on feature information in the single dimension in the n-dimensional feature information, to obtain n determining results, where the determining result includes that the representation manner of the first dynamic event is at least one of the extended attribute representation manner or the dynamic layer representation manner, and the map update apparatus determines that the representation manner of the dynamic event in the high-definition map is a representation manner that accounts for a largest proportion in the n determining results.

In this disclosure, the representation manner of the dynamic event may be determined based on the foregoing n dimensions by using a voting mechanism. This is also an implementation in which the representation manner of the dynamic event can be accurately determined.

In a possible implementation, after the map update apparatus determines, based on the n-dimensional feature information, the representation manner of the dynamic event in the high-definition map, the method further includes: the map update apparatus stores the dynamic event and the representation manner of the dynamic event in a memory in an associated manner.

In this disclosure, the determined representation manner and the corresponding dynamic event can be stored in the associated manner for subsequent query, so that repeated calculation during each use can be avoided, and computing resources can be saved.

In a possible implementation, when the dynamic event includes a second dynamic event, that the map update apparatus describes the dynamic event in the high-definition map based on the determined representation manner of the dynamic event includes: the map update apparatus obtains latest information of the second dynamic event, and obtains, from the memory, a representation manner of the second dynamic event, the map update apparatus determines that the representation manner of the second dynamic event is the extended attribute representation manner, and the map update apparatus creates an extended attribute table based on the latest information of the second dynamic event, and associates the created extended attribute table with the static layer in the high-definition map, or the map update apparatus modifies an existing extended attribute table based on the latest information of the second dynamic event.

In this disclosure, after it is determined that the dynamic event is described in the extended attribute representation manner, latest attribute information of the dynamic event is associated with the static layer, so that a latest status of the dynamic event can be updated in the high-definition map.

In a possible implementation, when the dynamic event includes a third dynamic event, that the map update apparatus represents the dynamic event in the high-definition map based on the determined representation manner of the dynamic event includes: the map update apparatus obtains latest information of the third dynamic event, and obtains, from the memory, a representation manner of the third dynamic event, the map update apparatus determines that the representation manner of the third dynamic event is the dynamic layer representation manner, and the map update apparatus creates a dynamic layer based on the latest information of the third dynamic event, or modifies an existing dynamic layer based on the latest information of the third dynamic event.

In this disclosure, after it is determined that the dynamic event is described in the dynamic layer representation manner, latest attribute information of the dynamic event is added to the corresponding dynamic layer, so that a latest status of the dynamic event can be updated in the high-definition map.

According to a second aspect, this disclosure provides a dynamic event update apparatus, where the apparatus includes an obtaining unit configured to obtain n-dimensional feature information of a dynamic event in n dimensions, where the n dimensions are n factors that affect representation of the dynamic event in a high-definition map, the dynamic event is an event that causes dynamic information in the high-definition map to change, and n is an integer greater than one, a determining unit configured to determine, based on the n-dimensional feature information, a representation manner of the dynamic event in the high-definition map, where the representation manner includes at least one of an extended attribute representation manner or a dynamic layer representation manner, the extended attribute representation manner is a representation manner of associating the dynamic event with a static layer in the high-definition map and using the dynamic event as an extended attribute of a static layer element, and the dynamic layer representation manner is a manner of adding the dynamic event to a dynamic layer in the high-definition map for update, and a update unit configured to update the dynamic event in the high-definition map based on the determined representation manner of the dynamic event.

It should be noted that the dynamic event update apparatus provided in this disclosure may be a server or a roadside unit (for example, it may be a road side unit (RSU)) or a vehicle-end device, where the vehicle-end device may include a vehicle, a processing device or unit in the vehicle, or the like.

In a possible implementation, the n dimensions include at least one of the following dimensions: an update frequency of a dynamic event status, an occurrence probability of an event, a degree of impact of an event on a topology of the high-definition map, a degree of an association change of an event, reusability of geometric representation of an event for the static layer, or a degree of independence of an event from the static layer.

In a possible implementation, when the dynamic event includes a plurality of dynamic events, the obtaining unit is further configured to obtain n-dimensional feature information of the plurality of dynamic events in the n dimensions, and the determining unit is further configured to determine, based on the n-dimensional feature information of the plurality of dynamic events in the n dimensions by using a clustering algorithm, representation manners of the plurality of dynamic events in the high-definition map.

In a possible implementation, the determining unit is further configured to classify, by using the clustering algorithm, the plurality of dynamic events to obtain a first-type dynamic event and a second-type dynamic event, and in a case of determining, through analysis based on n-dimensional feature information of the first-type dynamic event and n-dimensional feature information of the second-type dynamic event, that a degree of association between the first-type dynamic event and the static layer in the high-definition map is greater than a degree of association between the second-type dynamic event and the static layer in the high-definition map, classify the first-type dynamic event as an event described in the extended attribute representation manner, and classify the second-type dynamic event as an event described in the dynamic layer representation manner.

In a possible implementation, when the dynamic event includes a first dynamic event, the determining unit is further configured to determine a determining result of a representation manner of the first dynamic event in each single dimension based on feature information in the single dimension in the n-dimensional feature information, to obtain n determining results, where the determining result includes that the representation manner of the first dynamic event is at least one of the extended attribute representation manner or the dynamic layer representation manner, and determine that the representation manner of the dynamic event in the high-definition map is a representation manner that accounts for a largest proportion in the n determining results.

In a possible implementation, the apparatus further includes a storage unit configured to, after the determining unit determines, based on the feature information, the representation manner of the dynamic event in the high-definition map, store the dynamic event and the representation manner of the dynamic event in a memory in an associated manner.

In a possible implementation, when the dynamic event includes a second dynamic event, the update unit is further configured to obtain latest information of the second dynamic event, and obtain, from the memory, a representation manner of the second dynamic event, determine that the representation manner of the second dynamic event is the extended attribute representation manner, and create an extended attribute table based on the latest information of the second dynamic event, and associate the created extended attribute table with the static layer in the high-definition map, or modify an extended attribute table of the second dynamic event based on the latest information of the second dynamic event.

In a possible implementation, when the dynamic event includes a third dynamic event, the update unit is further configured to obtain latest information of the third dynamic event, and obtain, from the memory, a representation manner of the third dynamic event, determine that the representation manner of the third dynamic event is the dynamic layer representation manner, and create a dynamic layer based on the latest information of the third dynamic event, or modify, based on the latest information of the third dynamic event, a dynamic layer to which the third dynamic event belongs.

According to a third aspect, this disclosure provides a dynamic event update apparatus. The apparatus may include a processor configured to implement the high-definition map update method described in the first aspect. The apparatus may further include a memory. The memory is coupled to the processor. When executing a computer program stored in the memory, the processor can implement the high-definition map update method described in any one of the first aspect or the possible implementations of the first aspect. The apparatus may further include a communication port. The communication port is used by the apparatus to communicate with another apparatus. For example, the communication port may be a transceiver, a circuit, a bus, a module, or another type of communication port. It should be noted that the dynamic event update apparatus provided in this disclosure may be a server or a roadside unit (for example, it may be an RSU) or a vehicle-end device, where the vehicle-end device may include a vehicle, a processing device or unit in the vehicle, or the like.

In a possible implementation, the apparatus may include the memory configured to store the computer program, and the processor configured to obtain n-dimensional feature information of a dynamic event in n dimensions, where the n dimensions are n factors that affect update of the dynamic event in a high-definition map, the dynamic event is an event that causes dynamic information in the high-definition map to change, and n is an integer greater than one, determine, based on the n-dimensional feature information, a representation manner of the dynamic event in the high-definition map, where the representation manner includes at least one of an extended attribute representation manner or a dynamic layer representation manner, the extended attribute representation manner is a representation manner of associating the dynamic event with a static layer in the high-definition map and using the dynamic event as an extended attribute of a static layer element, and the dynamic layer representation manner is a manner of adding the dynamic event to a dynamic layer in the high-definition map for update, and updating the dynamic event in the high-definition map based on the determined representation manner of the dynamic event.

It should be noted that the computer program in the memory in this disclosure may be pre-stored, or may be downloaded from the Internet and stored when the apparatus is used. A source of the computer program in the memory is not further limited in this disclosure. Coupling in embodiments of this disclosure is indirect coupling or a connection between apparatuses, units, or modules for information exchange between the apparatuses, the units, or the modules, and may be in electrical, mechanical, or other forms.

According to a fourth aspect, this disclosure provides a computer-readable storage medium. The computer-readable storage medium stores a computer program, and when the computer program is executed by a processor, the method according to any one of implementations of the first aspect is implemented.

According to a fifth aspect, this disclosure provides a computer program product. When the computer program product is processed and executed, the method according to any one of implementations of the first aspect is performed.

According to a sixth aspect, this disclosure further provides a high-definition map. The high-definition map includes at least one of a static layer that carries dynamic information or a dynamic layer that carries dynamic information, and a representation manner of the dynamic information in the high-definition map is determined by using the method according to any one of implementations of the first aspect.

The solutions provided in the second aspect to the sixth aspect are used to implement or cooperated to implement the method provided in the first aspect, and therefore, can achieve beneficial effects the same as or corresponding to those in the first aspect. Details are not described herein again.

In conclusion, in this disclosure, the representation manner of the dynamic event in the high-definition map is evaluated from a plurality of dimensions, so that a representation manner of each dynamic event can be accurately determined, and automatic processing is easily implemented. Compared with the conventional technology, this disclosure provides a feasible and efficient high-definition map update method. Thus, event update of the high-definition map can be improved, and accuracy and automation of the event update of the high-definition map are improved.

BRIEF DESCRIPTION OF DRAWINGS

The following briefly describes the accompanying drawings of some of the embodiments of this disclosure.

DESCRIPTION OF EMBODIMENTS

The following describes the technical solutions in embodiments of this disclosure with reference to the accompanying drawings.

To better understand a high-definition map update method provided in embodiments of the present disclosure, the following first describes an example of a scenario to which this embodiment of the present disclosure is applicable.

For example, the high-definition map update method provided in this disclosure may be applied to a high-definition map. With development of autonomous driving, intelligent assisted driving, transportation networking, and the like, the high-definition map gradually becomes a tool to better serve these fields. For example, in the field of autonomous driving, the high-definition map describes a road more accurately, clearly, and comprehensively, and can reflect various dynamic events on the road in real time. Therefore, a lot of space can be provided for a vehicle in predetermining, and traveling can be preplanned, to ensure traveling stability and economy performance. In addition, the high-definition map can help the vehicle reduce a calculation amount. When the vehicle needs to pass through an intersection, the vehicle needs to sense a status of a signal lamp ahead in advance. In this case, the high-definition map can help the vehicle locate a specific area in which the signal lamp is located, to effectively reduce the calculation amount of full-range scanning and recognition.

The high-definition map update method provided in this disclosure may be further applied to another field, and is not limited to the field of high-definition maps described above.

To enable the high-definition map to implement the functions described above, various dynamic events that affect vehicle traveling need to be updated in the high-definition map, so that the vehicle can sense these dynamic events. However, there is no uniform industry standard and implementation product for update of the dynamic events in the high-definition map. Therefore, this disclosure provides a feasible and effective high-definition map update method, to better update the dynamic event that affects traveling in the high-definition map, so as to better serve a field such as driving.

Optionally, the high-definition map update method provided in this disclosure may be implemented in a server, a roadside unit, or a vehicle-end device (for example, a vehicle or a processing device or unit in a vehicle), and a device for implementing the high-definition map update method provided in this disclosure is referred to as a map update apparatus.

Figure 1:
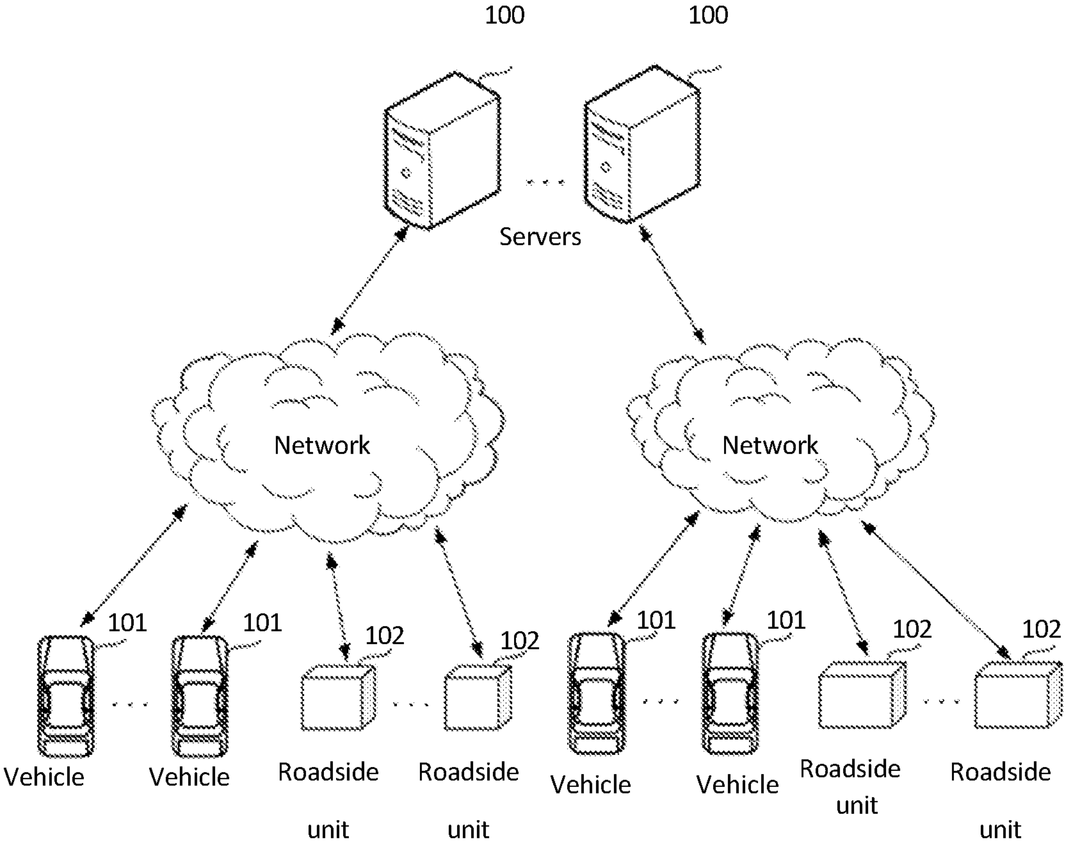
FIG. 1 is a schematic diagram of a system architecture used in a high-definition map update method according to an embodiment of this disclosure.

For ease of understanding, refer to FIG. 1. FIG. 1 is an example of a schematic diagram of a system architecture used in a high-definition map update method according to an embodiment of this disclosure. The system architecture may include a server 100, a vehicle 101, a roadside unit 102, and the like. The server 100 may include one or more servers, and the plurality of servers may form a server cluster. The server 100 may implement mutual communication with the vehicle 101 and the roadside unit 102 by using a network. In addition, the roadside unit 102 may also implement interactive communication with the vehicle 101.

The server 100 may interact with another device to obtain information used by a high-definition map. For example, the server 100 may interact with a device such as a server of a transportation bureau to obtain traffic information. For another example, the server 100 may interact with a device such as a server of a meteorological bureau to obtain weather information. The vehicle 101 may be an autonomous vehicle, a semi-autonomous vehicle, or may be a common vehicle, or the like.

If the high-definition map update method provided in this disclosure is implemented in the server 100, the vehicle 101 may interact with the server 100 to obtain a high-definition map in a latest status. Alternatively, the server 100 may send a high-definition map in a latest status to the roadside unit 102, and the vehicle 101 interacts with the roadside unit 102 to obtain the high-definition map.

If the high-definition map update method provided in this disclosure is implemented in the roadside unit 102, the roadside unit 102 may obtain latest information about various dynamic events from the server 100, and update the high-definition map based on the latest information. The vehicle 101 may then interact with the roadside unit 102 to obtain a high-definition map in a latest status.

If the high-definition map update method provided in this disclosure is implemented in the vehicle 101, the vehicle 101 may obtain latest information about various dynamic events from the server 100, and update the high-definition map for use based on the latest information.

It should be noted that the system mechanism shown in FIG. 1 is merely an example. As long as a system architecture that can be applied to the high-definition map update method provided in this disclosure falls within the protection scope of this disclosure, a specific used system architecture is not limited in this disclosure.

Figure 2:
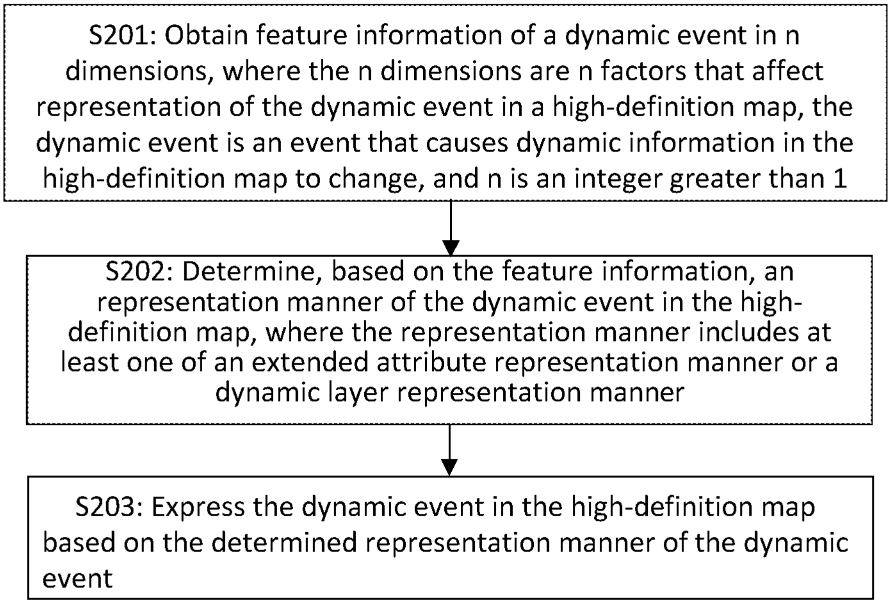
FIG. 2 is a schematic flowchart of a high-definition map update method according to an embodiment of this disclosure.

Based on the foregoing description, the following describes a feasible and effective high-definition map update method provided in this disclosure. Refer to FIG. 2. The method is performed by the foregoing map update apparatus, and may include but is not limited to the following steps.

S201: Obtain feature information of a dynamic event in n dimensions, where the n dimensions are n factors that affect update of the dynamic event in a high-definition map, the dynamic event is an event that causes dynamic information in the high-definition map to change, and n is an integer greater than 1.

In a specific embodiment, the dynamic event may include some or all of the following events:

A weather status: The weather status may include a dynamic event such as a temperature status, an atmospheric pressure status, a humidity condition, a sunny day, a cloudy day, a windy condition, a hazy condition, a rainy condition, a lightning condition, a snowy condition, a frosty condition, a thunder condition, or a hail condition.

A road coverage condition or a road environment: The road coverage condition or the road environment may include a dynamic event such as water accumulation, snow accumulation, ice or breakage of road coverage.

A road adhesion coefficient condition: The road adhesion coefficient condition refers to adhesion between a road and a vehicle tire, where the greater the adhesion, the less likely a vehicle is to skid.

A road visibility condition: The road visibility condition may refer to a visible distance caused by haze or light.

A temporary point of interest (POI) condition: The temporary point of interest condition may include a dynamic event such as a non-fixed point of interest, a temporary available parking space, a temporary available charging pile, or a temporary public service point.

A recommendation information condition: The recommendation information condition may include a dynamic event such as user interest point recommendation or itinerary suggestion recommendation.

A road traffic condition: The road traffic condition may include a dynamic event such as a traffic accident, traffic control, road construction, or an accident-prone road section.

A traffic flow condition: The traffic flow condition may include an amount of traffic flow on each road.

A traffic light status: The traffic light status may include a dynamic event such as a traffic light phase status, semantic information, timing data, or a working status.

A vehicle obstacle: The vehicle obstacle may include a type of a vehicle causing the obstacle, motion information, vehicle lamp and door information, control information, driving behavior prediction information, or the like.

Another obstacle: The other obstacle may include all obstacles except the vehicle obstacle.

A risk warning condition: The risk warning condition may include information such as a risk type (a collision risk in each direction, a landslide risk, and the like), a risk level, or a preventative suggestion.

A collaborative driving condition: The collaborative driving condition may refer to vehicle collaborative guide information, including lane change collaboration, steering collaboration, special vehicle avoidance, parking and entry collaboration, and the like.

A route planning condition: The route planning condition may refer to a planned route of a traveling route made based on an existing road condition, and the like.

A road network topology change condition: The road network topology change condition may refer to a temporary change of a drivable route caused by a road traffic event, such as a change in geometric update or attribute of a road route and a lane line.

The foregoing example describes some dynamic events applied to the high-definition map, and in an application, a granularity of the dynamic event may be finer. For example, when the dynamic event, namely, the weather status, is actually updated in the high-definition map, it can be updated as a specific event such as raining, snowing or a sunny day. These dynamic events can be updated and updated in the high-definition map in real time. This can provide various dynamic conditions in the road for an object using the high-definition map such as a vehicle in real time, and provide powerful reference for further route planning and behavior prediction. It should be noted that a dynamic event actually used for the high-definition map is not limited to the foregoing events. A specific dynamic event and a specific quantity are not limited in this disclosure.

There are various types of dynamic events. When the plurality of types of dynamic events are updated in the high-definition map, a proper update method may be selected to update a corresponding dynamic event. In this disclosure, a representation manner of a dynamic event in the high-definition map may include an extended attribute representation manner and a dynamic layer representation manner.

The foregoing extended attribute representation manner is a representation manner of associating a dynamic event with a static layer in the high-definition map and using the dynamic event as an extended attribute of a static map element. The extended attribute may be a coverage of an existing attribute of the static map element to update an attribute change of the static map element, or may be an extended addition of an attribute of the static map element. The static map element may include a lane, a crosswalk, a billboard along a road, an isolation belt, a speed limit sign, a traffic light or a roadside phone booth, and the like.

The foregoing dynamic layer representation manner is a manner of adding a dynamic event to a dynamic layer associated with the static layer for update. Therefore, it can be seen that the dynamic event updated in the extended attribute representation manner has a great degree of association with the static layer, while the dynamic event updated in the dynamic layer representation manner has a small degree of association with the static layer.

In this case, how to select a proper representation manner for a dynamic event is a problem to be resolved. In this disclosure, a specific representation manner of a dynamic event may be evaluated from some considered dimensions. The foregoing n dimensions may include at least one of the following dimensions:

An update frequency of an event status: This dimension may be used to evaluate a change frequency of a dynamic event. For example, for the dynamic event, namely, the vehicle obstacle, the dynamic event frequently changes in a vehicle traveling process, and therefore the change frequency is high. However, for the dynamic event, namely, the road adhesion coefficient, the change frequency is low.

An occurrence probability of an event: This dimension can be used to evaluate whether a dynamic event occurs frequently or occasionally.

A degree of impact of an event on a topology of the high-definition map: This dimension can be used to evaluate a degree of impact of a dynamic event on a topology of a static layer of the high-definition map. The topology of the static layer is a road network structure within coverage of the high-definition map, and includes an association relationship between upper and lower nodes of a passable area, and the like. For example, information about the traffic light status is only a status or an attribute of a traffic light element in the static layer, and a change of a traffic light status does not affect the topology structure of the map. However, dynamic events such as the road construction or traffic accident occupy lanes and affect the passable area and lane, thereby changing a passable topology and greatly affecting a map topology.

A degree of an association change of an event: This dimension can be used to evaluate a degree of impact of an occurrence or a status change of a dynamic event on an occurrence or a dynamic change of another dynamic event. For example, a change in a value of the road adhesion coefficient may be considered as a status change of a road attribute, and does not greatly affect an occurrence or a status change of another dynamic event. However, if the dynamic event of raining occurs, the value of road adhesion coefficient may be affected, and the road adhesion coefficient may be smaller after raining.

Reusability of geometric update of an event to the static layer: This dimension may be used to evaluate whether geometric update of a dynamic event is the same as or corresponding to geometric update of a corresponding map element in the static layer. In addition, this dimension can be used to evaluate whether a dynamic event can directly use the geometric update of the map element at a corresponding location in the static layer without being updated separately. For example, the dynamic event, namely, the traffic light status information can directly reuse a traffic light in the static layer without using another geometric entity in the map. For another example, if the dynamic event, namely, the vehicle obstacle does not exist in the static layer, the vehicle obstacle needs to be updated in the map in another manner.

The geometric update of the dynamic event refers to a geometric form of each dynamic event in the high-definition map. For example, a dynamic event in a weather status such as raining, snowing, a sunny day, and a cloudy day can be updated by an area-level planar set in the high-definition map. For another example, the road construction and traffic accident may generally be updated by an irregular graphic formed by vertices and lines of a polygon at a road level or lane level.

The area-level planar geometric update may be a polygonal surface, an annular surface, or the like. A difference between the area-level geometric update and the road-level geometric update lies in that an area-level event with a large impact range may directly update a geometric location in a map tile, and a road-level event needs to update a geometric location on a road. Relative coordinates of a location point of the road geometric update are determined relative to a feature reference point on the road.

A degree of independence of an event from the static layer: This dimension may be used to evaluate a degree of dependency of update of a dynamic event on the static layer. For example, the dynamic event, namely, the weather status is generally a large-scale event that can be geometrically updated, and does not depend on the road network structure of the static map. Therefore, the dynamic event, namely, the weather status is less dependent on the static layer and the layer is more independent. For another example, the dynamic event such as the road construction needs to be updated in a specific location of lane construction, depends on the road network structure of the static layer, and is relatively dependent on the static layer, so independence of this event is low.

The foregoing example describes a plurality of considered dimensions that may be used for dynamic event update. It should be noted that actually considered dimensions are not limited to the foregoing description, and a specific considered dimension is not limited in this disclosure.

After the n dimensions used to evaluate the specific representation manner of the dynamic event are determined, feature information of the dynamic event in the n dimensions may be obtained, where the feature information represents a feature of the dynamic event in each dimension. For ease of understanding, an example is used below for description.

It is assumed that the foregoing n dimensions are three dimensions: the update frequency of an event status, the occurrence probability of an event, and the degree of independence of an event from the static layer. It is assumed that the dynamic event includes several events: the weather status, the traffic accident, the accident-prone road section, the vehicle obstacle, and the traffic light status. For feature information of the several dynamic events in the three dimensions, refer to Table 1.

TABLE 1

| | Event | | | | |
|---|---|---|---|---|---|
| Dimension | Weather status | Traffic accident | Accident-prone road section | Vehicle obstacle | Traffic light status |
| Update frequency of an event status | 0.1 | 0.5 | 0.01 | 1 | 0.9 |
| Occurrence probability of an event | 1 | 0.1 | 0.1 | 1 | 0.2 |
| Degree of independence of an event from the static layer | 1 | 0.8 | 0.1 | 0.8 | 0.1 |

In Table 1, feature information of the dynamic event in each dimension is obtained after parameterization and normalization processing is performed. For the dimension, namely, the update frequency of an event status, the feature information of the events, namely, the weather status, the traffic accident, the accident-prone road section, the vehicle obstacle, and the traffic light status is 0.1, 0.5, 0.01, 1, and 0.9, respectively. Alternatively, in other words, update frequencies of the events, namely the weather condition, the traffic accident, the accident-prone road section, the vehicle obstacle, and the traffic light condition are 0.1, 0.5, 0.01, 1 and 0.9. A larger value indicates a higher update frequency. It can be seen that the two events: the vehicle obstacle and the traffic light status change frequently, so the update frequency is very high, and the two events are almost events with the highest update frequency. A status of the traffic accident also changes frequently, but does not change as fast as the vehicle obstacle and the traffic light status, so the update frequency is 0.5. However, the weather condition and the accident-prone road section change relatively little, so the update frequency is low.

For the dimension, namely, the occurrence probability of an event, the feature information of events, namely, the weather status, the traffic accident, the accident-prone road section, the vehicle obstacle, and the traffic light status is 1, 0.1, 0.1, 1, and 0.2, respectively. Alternatively, in other words, occurrence probabilities of the events, namely, the weather condition, the traffic accident, the accident-prone road section, the vehicle obstacle, and the traffic light condition are 1, 0.1, 0.1, 1 and 0.2. Similarly, a larger value indicates a higher probability of an event. The weather status and the vehicle obstacle are inevitable events, so the occurrence probabilities of the two events are 1. The traffic accident, the accident-prone road section, and the traffic light status are accidental events, so the occurrence probability is low.

For the dimension, namely, the degree of independence of an event from the static layer, the feature information of the events, namely, the weather status, the traffic accident, the accident-prone road section, the vehicle obstacle, and the traffic light status is 1, 0.8, 0.1, 0.8, and 0.1 respectively. Alternatively, in other words, the degrees of independence between the events, namely, the weather status, the traffic accident, the accident-prone road section, the vehicle obstacle, and the traffic light status and the static layer are 1, 0.8, 0.1, 0.8, and 0.1. Similarly, a larger value indicates a greater degree of independence. The events, namely, the weather status, the traffic accident, and the vehicle obstacle are less dependent on the static layer, and therefore the degrees of independence of the events are relatively great. The two events, namely, the accident-prone road section and the traffic light status need to be updated together depending on information such as a lane and a traffic light in the static layer, and are relatively dependent, and therefore, the degrees of independence of the two events are relatively small.

It should be noted that the feature information of the dynamic event in each dimension may be preconfigured, or may be obtained through calculation based on a set condition. For example, the feature of each dimension in Table 1 is represented by a value. However, in a specific implementation process, the feature information of the dynamic event in each dimension may be represented by a level or the like. A representation manner of the feature information is not limited in this disclosure.

S202: Determine, based on the feature information, a representation manner of the dynamic event in the high-definition map, where the representation manner includes at least one of the extended attribute representation manner or the dynamic layer representation manner.

After the feature information of the dynamic event in the n dimensions is obtained, it may be determined, based on the feature information, whether the representation manner of the dynamic event is the extended attribute representation manner or the dynamic layer representation manner, or both the extended attribute representation manner and the dynamic layer representation manner.

In a specific implementation process, the representation manner of the dynamic event may be determined based on the feature information in a plurality of implementations. Examples are used below to describe several possible implementations.

The following first describes an implementation 1: The representation manner of the dynamic event is determined by using a clustering algorithm.

In this implementation, the foregoing dynamic event includes m types of dynamic events, and m is an integer greater than one. Further, the feature information of each dynamic event respectively obtained in the n dimensions is n-dimensional feature information of the dynamic event in the m dynamic events in the n dimensions.

After the n-dimensional feature information of each dynamic event in the n dimensions is obtained, the n-dimensional feature information of the dynamic event may be constructed as coordinates in an n-dimensional coordinate system, to obtain m n-dimensional coordinates. The m dynamic events are classified based on the m n-dimensional coordinates by using the clustering algorithm. A representation manner of each dynamic event in the m dynamic events is determined based on the classification result.

Further, an n-dimensional coordinate system may be created, and n coordinate axes of the n-dimensional coordinate system represent the n dimensions. In this case, feature information of each dynamic event in the m dynamic events in the n dimensions may be represented as one n-dimensional coordinate, so that m n-dimensional coordinates may be obtained for the m dynamic events. The m n-dimensional coordinates are classified by using the clustering algorithm, and the m coordinates may be classified into two types, that is, the m dynamic events are classified into two types, where one type is updated in the extended attribute representation manner, and the other type is updated in the dynamic layer representation manner.

In a specific implementation process, the clustering algorithm includes a plurality of algorithms, for example, a K-Means clustering algorithm, a mean shift clustering algorithm, and a density-based clustering method. This disclosure imposes no limitation on which clustering algorithm is further used for calculation.

For ease of understanding, the m dynamic events are classified into two types by using the clustering algorithm. The following describes an example in which the K-Means clustering algorithm is used. Algorithm steps of the K-Means clustering algorithm include: (1) randomly dividing data points of the m n-dimensional coordinates into two groups, and randomly initializing respective central points of the two groups, (2) calculating a distance between each data point and a corresponding center point, and classifying the data point into a type to which the data point closest to the center point belongs, (3) calculating the center point of each type as a new center point, and (4) repeating the foregoing steps until the center point of each type does not change much after each iteration. Alternatively, the center point may be initialized randomly for many times, and then calculation is performed based on the foregoing four steps to select the one with the best calculation result.

Using three dimensions and five events in Table 1 as an example, a three-dimensional coordinate system may be constructed. Three coordinate axes of the coordinate system respectively represent three dimensions: the update frequency of an event status, the occurrence probability of an event, and the degree of independence of an event from the static layer. The five events: the weather status, the traffic accident, the accident-prone road section, the vehicle obstacle, and the traffic light status are represented as five data points in the three-dimensional coordinate axes, and three-dimensional coordinates of the five data points are respectively (0.1, 1, 1), (0.5, 0.1, 0.8), (0.01, 0.1, 0.1), (1, 1, 0.8), and (0.9, 0.2, 0.1).

Then, the five points are classified by using the algorithm steps of the K-Means clustering algorithm, and a final classification result is that the data point (0.1, 1, 1) and the data point (1, 1, 0.8) are classified into one type, that is, the weather status and the vehicle obstacle are classified into one type, and the data point (0.5, 0.1, 0.8), the data point (0.01, 0.1, 0.1), and the data point (0.9, 0.2, 0.1) are classified into one type, that is, traffic accident, accident-prone road section, and traffic light status are classified into one type.

In a possible implementation, after the m dynamic events are classified into two types, feature information of the two types of dynamic events in the n dimensions may be further analyzed. Because the feature information mainly represents a degree of association between the dynamic event and the static layer, after analysis, a type of dynamic events with a great degree of association with the static layer may be classified as an event updated in the extended attribute representation manner, and another type of dynamic events with a small degree of association with the static layer may be classified as an event updated in the dynamic layer representation manner.

For ease of understanding of a degree of association between a dynamic event and the static layer, the following uses the foregoing dimensions as an example for description.

For the dimension, namely, the update frequency of an event status, a dynamic event with a lower update frequency has a greater degree of association with the static layer, and a dynamic event with a higher update frequency has a smaller degree of association with static layer.

For the dimension, namely, the occurrence probability of an event, a dynamic event with a lower occurrence probability has a greater degree of association with the static layer, and a dynamic event with a higher occurrence probability has a smaller degree of association with the static layer.

For the dimension, namely, the degree of impact of an event on a topology of the high-definition map, a dynamic event with a smaller degree of impact on the topology of the high-definition map has a greater degree of association with the static layer, and a dynamic event with a greater degree of impact on the topology of the high-definition map has a smaller degree of association with the static layer.

For the dimension, namely, the degree of an association change of an event, a dynamic event with a smaller degree of an association change has a greater degree of association with the static layer, and a dynamic event with a greater degree of association change has a smaller degree of association with the static layer.

For the dimension, namely, the reusability of geometric update of an event for the static layer, a dynamic event whose geometric update has higher reusability for the static layer has a greater degree of association with the static layer, and a dynamic event whose geometric update has lower reusability for the static layer has a smaller degree of association with the static layer.

For the dimension, namely, the degree of independence of an event from the static layer, a dynamic event with a smaller degree of independence from the static layer has a greater degree of association with the static layer, and a dynamic event with a greater degree of independence from the static layer has a smaller degree of association with the static layer.

For ease of understanding, specific representation manners of the two types of dynamic events obtained through classification are determined based on the degree of association between the dynamic event and the static layer, the following uses an example for description. In the foregoing example, a classification result has been obtained: a first type includes the weather status and the vehicle obstacle, and a second type includes the traffic accident, the accident-prone road section, and the traffic light status. Through analysis on independence of the two types of dynamic events from the static layer in the three dimensions, namely, the update frequency of an event status, the occurrence probability of an event, and the degree of independence of an event from the static layer, it is found that, the first-type dynamic event has a smaller degree of association with the static layer than the second-type dynamic event. Therefore, the first-type dynamic event is updated in the dynamic layer representation manner, and the second-type dynamic event is represented in the extended attribute representation manner.

The following describes an implementation 2: The representation manner of the dynamic event is determined by using a voting mechanism.

In this implementation, a dynamic event is used as an example for description. The dynamic event may be referred to as a first dynamic event. Further, the feature information of each dynamic event respectively obtained in the n dimensions includes n-dimensional feature information of the first dynamic event in the n dimensions.

After the n-dimensional feature information of the first dynamic event in the n dimensions is obtained, a determining result of a representation manner of the first dynamic event in each single dimension is determined based on feature information in the single dimension in the n-dimensional feature information of the first dynamic event. In this way, n determining results are obtained, where the determining result includes that the representation manner of the first dynamic event is at least one of the extended attribute representation manner or the dynamic layer representation manner. Then, it is determined that the representation manner of the dynamic event in the high-definition map is a representation manner that accounts for a largest proportion in the n determining results.

Further, it is determined, based on the voting mechanism, that the first dynamic event is updated in the extended attribute representation manner in p1 dimensions of the n dimensions, and is updated in the dynamic layer representation manner in p2 dimensions of the n dimensions. Then, values of p1 and p2 are compared. If p1 is greater than p2, the first dynamic event is updated in the extended attribute representation manner. If p2 is greater than p1, the first dynamic event is updated in the dynamic layer representation manner. Alternatively, p1 and p2 are separately compared with n/2. If p1 is greater than n/2, the first dynamic event is updated in the extended attribute representation manner, or if p2 is greater than n/2, the first dynamic event is updated in the dynamic layer representation manner.

If the first dynamic event is updated in the extended attribute representation manner in a dimension, it indicates that a degree of association between the first dynamic event and the static layer in the dimension is great. If the first dynamic event is updated in the dynamic layer representation manner in a dimension, it indicates that a degree of association between the first dynamic event and the static layer in the dimension is small.

For ease of understanding, an example is used for description, reference is still made to the foregoing Table 1. The weather status event in Table 1 is used as an example for description. It can be learned from Table 1 that feature information of the weather status is 0.1, 1, and 1 in three dimensions: the update frequency of an event status, the occurrence probability of an event, and the degree of independence of an event form the static layer, where the feature information of the weather status is both 1 in the two dimensions: the occurrence probability of an event, and the degree of independence of an event from the static layer, it indicates that the weather status is almost unassociated with the static layer in the two dimensions. Therefore, it may be determined in the two dimensions that the weather status is updated in the dynamic layer representation manner. In the dimension, namely, the update frequency of an event status, a degree of association between the weather status and the static layer is great, which indicates that the weather status is updated in the extended attribute representation manner. However, dimensions in which the weather status is updated in the dynamic layer representation manner are more, and there are more than 3/2 dimensions. Therefore, it is determined that the weather status is updated in the dynamic layer representation manner.

The following describes an implementation 3: The representation manner of the dynamic event is determined by using a priority mechanism.

In this implementation, the first dynamic event is also used as an example for description. Further, it is determined a representation manner of the first dynamic event is evaluated from n dimensions, and the n dimensions have priorities. For example, the representation manner may be evaluated from a dimension with a highest priority, that is, a representation manner indicated from the dimension with the highest priority is the representation manner of the first dynamic event.

The weather status in Table 1 is still used as an example. Table 1 provides three dimensions: the update frequency of an event status, the occurrence probability of an event, and the degree of independence of an event from the static layer for evaluating the representation manner of the dynamic event. However, priorities of the three dimensions are in descending order: the degree of independence of an event from the static layer, the update frequency of an event status, and the occurrence probability of an event. Therefore, the representation manner of the weather status is evaluated from the dimension, namely, the degree of independence of an event from the static layer. In Table 1, the feature information is 1 in the dimension, namely, the degree of independence of an event from the static layer, indicating that the weather status is almost unassociated with the static layer. Therefore, it is determined that the weather status is represented in the dynamic layer representation manner.

It should be noted that the foregoing describes only several implementations of determining, based on the feature information, the representation manner of the dynamic event as examples. In a specific embodiment, this is not limited to the foregoing implementations.

Figure 3:
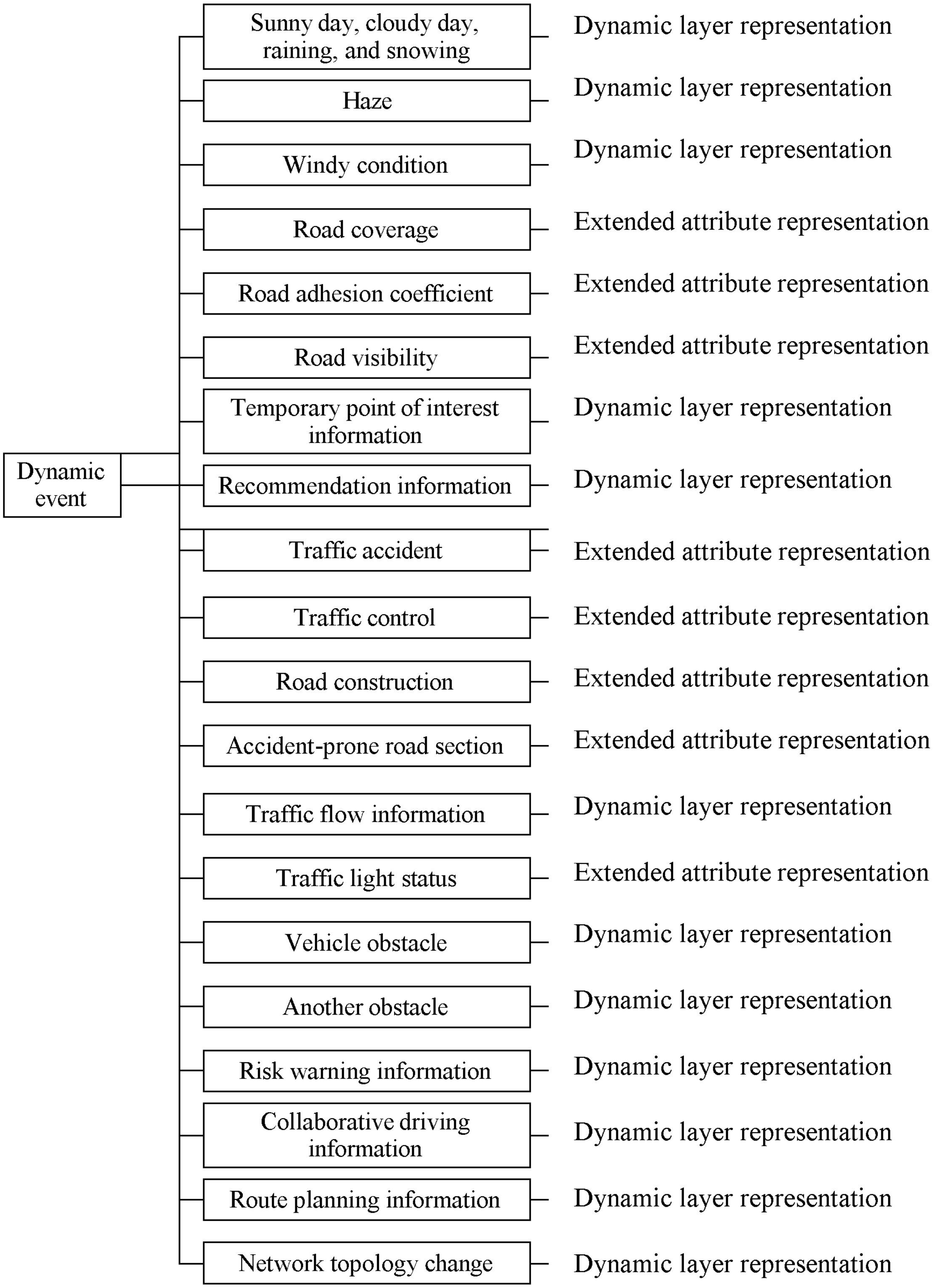
FIG. 3 is a schematic diagram of representation manners of various dynamic events according to this disclosure.

Representation manners of various dynamic events may be determined in the foregoing described manners. For example, FIG. 3 lists representation manners corresponding to the various dynamic events. However, FIG. 3 is merely an example. In a specific implementation process, some dynamic events may be represented in the extended attribute representation manner, or may be represented in the dynamic layer representation manner. Therefore, there is no limitation that a dynamic event can be represented in only one representation manner. In addition, representation manners of the dynamic event obtained by using different implementations of determining the dynamic event may be different, and a specific representation manner of the dynamic event is determined based on an actually used representation manner determining method.

In a possible implementation, after the representation manners of the various dynamic events are determined, the various dynamic events and the representation manners corresponding to the various dynamic events may be stored in a memory in an associated manner, so that the various dynamic events and the representation manners corresponding to the various dynamic events can be directly obtained and used subsequently without being recalculated each time for use, thereby saving computing resources. Certainly, when a new dynamic event occurs, a representation manner of the new dynamic event may also be determined based on the method described above, and stored for subsequent use.

S203: Represent the dynamic event in the high-definition map based on the determined representation manner of the dynamic event.

After the representation manner of the dynamic event is determined, the dynamic event may be represented in the high-definition map based on the representation manner.

The following describes a process of representing the dynamic event in the high-definition map after the various representation manners of the dynamic event are determined.

A dynamic event in the plurality of dynamic events is used as an example for description. The dynamic event may be referred to as a second dynamic event. In a specific embodiment, the high-definition map may run in a server, or may run in a vehicle. That the high-definition map runs in the server is used as an example. When a device such as the vehicle needs to obtain the high-definition map, the device may obtain a high-definition map of an area through interaction with the server. The server may obtain information about various dynamic events through monitoring, or obtain dynamic events through interaction with another server, a roadside device, or the vehicle. For example, the server may obtain information about various dynamic events of a weather status through interaction with a server of a meteorological bureau. For another example, the server may obtain information about various traffic events through interaction with a server of a traffic bureau, and then update the obtained information about the dynamic event in the high-definition map.

In a specific embodiment, the server obtains latest information of the second dynamic event, and further may further obtain information such as a specific type, an occurrence location, and a description of a latest status of the second dynamic event, and then find the second dynamic event in the memory and obtain a representation manner corresponding to the second dynamic event.

In a possible implementation, the representation manner corresponding to the second dynamic event is the extended attribute representation manner. In this case, if the information about the second dynamic event is obtained for the first time, an extended attribute table may be created for the second dynamic event, and the latest information of the second dynamic event is added to the extended attribute table, where the latest information may include information such as the description of the latest status of the second dynamic event. Then, the extended attribute table is associated with the static layer.

Figure 4:
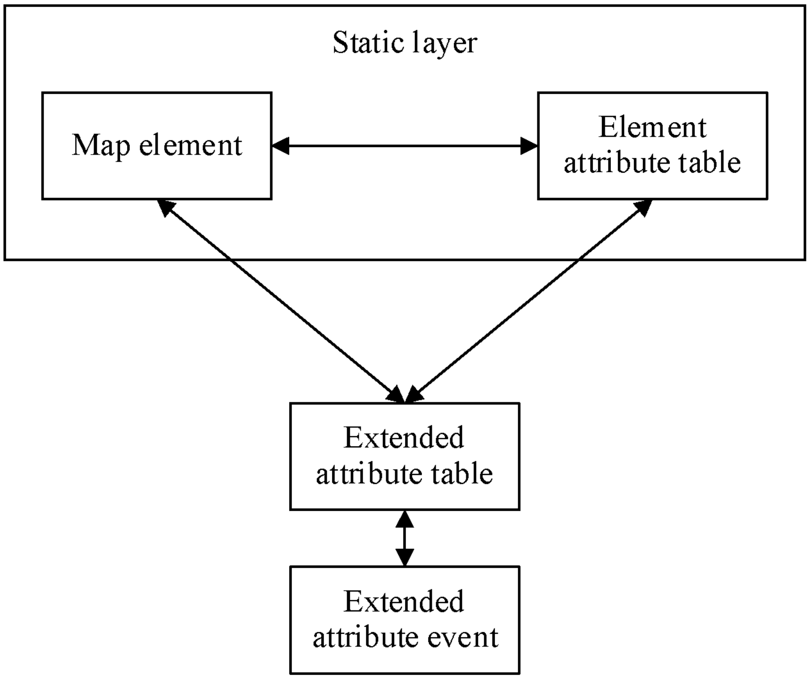
FIG. 4 is a schematic diagram of associating an extended attribute table with a static layer according to this disclosure.

For example, refer to FIG. 4. The extended attribute table is associated with the static layer. The extended attribute table may be associated with a map element in a static layer of a corresponding location based on information about a location at which the second dynamic event occurs, and is associated with an element attribute table of the map element. An extended attribute event in FIG. 4 is the second dynamic event. The element attribute table of the map element includes information such as some static attributes of the map element. For example, if the map element is one lane, an element attribute table of the lane may include a marking condition, a lane quantity condition, and the like of the vehicle. If the second dynamic event is a road adhesion coefficient, and the description of the latest status is that the road adhesion coefficient falls within a range of 0.3 to 0.4, the description of the latest state may be added to the created extended attribute table, and is associated with the lane in the static layer and the element attribute table of the lane. In this way, when reading attribute information in the lane, the server may obtain a latest road adhesion coefficient of the lane, and representation the latest road adhesion coefficient in the high-definition map.

If the server does not obtain the second dynamic event for the first time, the server may update the obtained description of the latest status to the extended attribute table of the second dynamic event, so that the information represented by the server in the high-definition map is information of the latest status.

In another possible implementation, the representation manner corresponding to the second dynamic event is the dynamic layer representation manner. In this case, if the second dynamic event has no dynamic layer associated with the second dynamic event, a dynamic layer associated with the second dynamic event may be created. The dynamic layer is associated with the static layer of the high-definition map. It should be noted that one dynamic layer may include one or more dynamic events, and is not limited to one dynamic layer having only one dynamic event.

Figure 5:
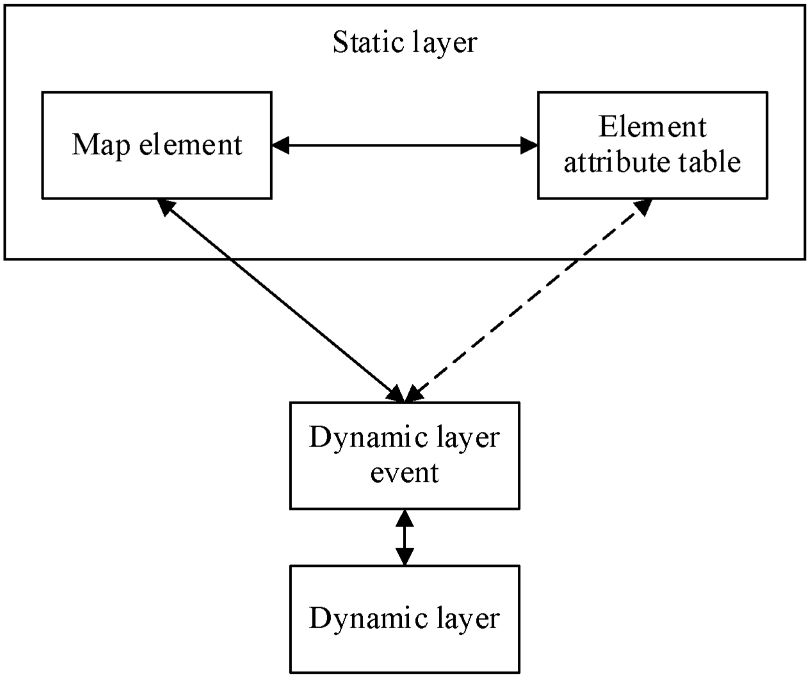
FIG. 5 is a schematic diagram of associating a dynamic layer with a static layer according to this disclosure.

For example, refer to FIG. 5. The dynamic layer event described in FIG. 5 is a dynamic event represented in the dynamic layer. It is assumed that the second dynamic event is represented in the dynamic layer, the dynamic layer is associated with the static layer of the high-definition map. The second dynamic event may be associated with a corresponding map element in the static layer based on the location information at which the second dynamic event occurs. In addition, optionally, the second dynamic event may be further associated with the element attribute table corresponding to the static layer. Because this is an optional operation, association between the dynamic layer event and the element attribute table in FIG. 5 is represented by using a dashed line.

The dynamic event in the dynamic layer may also be associated with an attribute table. Similarly, the attribute table may be used to record information such as a latest status description of the dynamic event. For example, the second dynamic event may be a weather status, a dynamic layer may be specially created to represent the weather status, and an occurrence location corresponding to the weather status is in a small town. When the latest status description is that it rains moderately and lasts for about half an hour, the server may describe the weather status of the town area in the dynamic layer as moderate rain, and the weather status lasts for about half an hour.

If the second dynamic event already has an associated dynamic layer after the second dynamic event is obtained, the latest status description of the second dynamic event is directly updated to a corresponding location in the dynamic layer, so that information represented by the server in the high-definition map is the latest status information.

Optionally, the high-definition map generally includes a plurality of dynamic layers. Therefore, for ease of management, the plurality of dynamic layers may be encoded, and the encoding is associated with a dynamic event in the dynamic layer indicated by the encoding, so that when a dynamic event is updated, a corresponding layer can be quickly locked based on corresponding layer coding and the updated information is quickly updated to the dynamic layer.

In conclusion, this disclosure provides a high-definition map update method and device, and can provide a feasible and effective high-definition map update method, to improve event representation of a high-definition map, and improve accuracy of the event representation of the high-definition map.

The foregoing mainly describes the high-definition map update method provided in embodiments of this disclosure. It may be understood that, to implement the foregoing functions, each device includes corresponding hardware structures and/or software modules for performing corresponding functions. Persons skilled in the art should easily be aware that, in combination with units and algorithm steps of the examples described in embodiments disclosed in this specification, this disclosure may be implemented by hardware or a combination of hardware and computer software. Whether a function is performed by hardware or hardware driven by computer software depends on particular applications and design constraints of the technical solutions. Persons skilled in the art may use different methods to implement the described functions for each particular application, but it should not be considered that the implementation goes beyond the scope of this disclosure.

In embodiments of this disclosure, the device may be divided into functional modules based on the foregoing method examples. For example, each functional module may be obtained through division based on each corresponding function, or two or more functions may be integrated into one module. The integrated module may be implemented in a form of hardware, or may be implemented in a form of a software functional module. It should be noted that, in embodiments of this disclosure, division into modules is an example, and is merely a logical function division. In an actual implementation, another division manner may be used.

Figure 6:
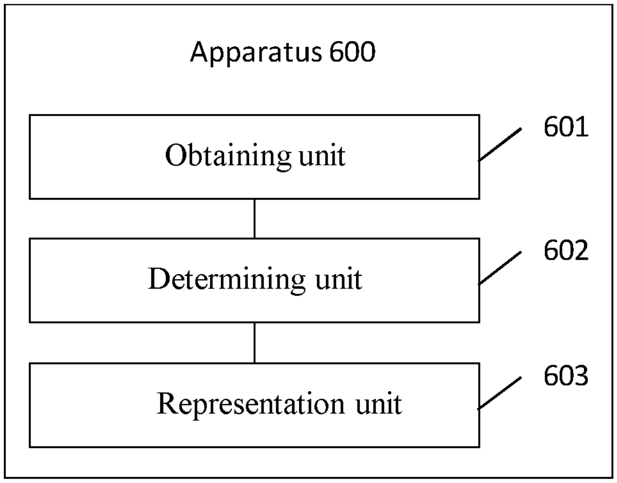
FIG. 6 is a schematic diagram of a logical structure of a device according to an embodiment of this disclosure.

When each functional module is obtained through division corresponding to each function, FIG. 6 is a schematic diagram of a possible logical structure of an apparatus. The apparatus may be the foregoing map update apparatus, or may be a chip in the map update apparatus, or may be a processing system or the like in the map update apparatus. The apparatus 600 includes an obtaining unit 601, a determining unit 602, and a representation unit 603.

The obtaining unit 601 is configured to obtain n-dimensional feature information of a dynamic event in n dimensions, where the n dimensions are n factors that affect representation of the dynamic event in a high-definition map, the dynamic event is an event that causes dynamic information in the high-definition map to change, and n is an integer greater than one. The obtaining unit 601 can execute the operation in S201 shown in FIG. 2.

The determining unit 602 is configured to determine, based on the feature information, a representation manner of the dynamic event in the high-definition map. The determining unit 602 may execute the operation in S202 shown in FIG. 2.

The representation unit 603 is configured to represent the dynamic event in the high-definition map based on the determined representation manner of the dynamic event. The representation unit 603 may execute the operation in S203 shown in FIG. 2.

In a possible implementation, the n dimensions include at least one of the following dimensions: an update frequency of a dynamic event status, an occurrence probability of an event, a degree of impact of an event on a topology of the high-definition map, a degree of an association change of an event, reusability of geometric representation of an event for the static layer, or a degree of independence of an event from the static layer.

When the dynamic event includes a plurality of dynamic events, the obtaining unit 601 is further configured to obtain n-dimensional feature information of the plurality of dynamic events in the n dimensions, and the determining unit 602 is further configured to determine, based on the n-dimensional feature information of the plurality of dynamic events in the n dimensions by using a clustering algorithm, representation manners of the plurality of dynamic events in the high-definition map.

In a possible implementation, the determining unit 602 is further configured to classify, by using the clustering algorithm, the plurality of dynamic events to obtain a first-type dynamic event and a second-type dynamic event, and in a case of determining, through analysis based on n-dimensional feature information of the first-type dynamic event and n-dimensional feature information of the second-type dynamic event, that a degree of association between the first-type dynamic event and the static layer in the high-definition map is greater than a degree of association between the second-type dynamic event and the static layer in the high-definition map, classify the first-type dynamic event as an event represented in the extended attribute representation manner, and classify the second-type dynamic event as an event represented in the dynamic layer representation manner.

In a possible implementation, when the dynamic event includes a first dynamic event, the representation unit 602 is further configured to determine a determining result of a representation manner of the first dynamic event in each single dimension based on feature information in the single dimension in the n-dimensional feature information, to obtain n determining results, where the determining result includes that the representation manner of the first dynamic event is at least one of the extended attribute representation manner or the dynamic layer representation manner, and determine that the representation manner of the dynamic event in the high-definition map is a representation manner that accounts for a largest proportion in the n determining results.

In a possible implementation, the device further includes a storage unit configured to, after the determining unit 602 determines, based on the feature information, the representation manner of the dynamic event in the high-definition map, store the dynamic event and the representation manner of the dynamic event in a memory in an associated manner.

In a possible implementation, when the dynamic event includes a second dynamic event, the representation unit 603 is further configured to obtain latest information of the second dynamic event, and obtain, from the memory, a representation manner of the second dynamic event, determine that the representation manner of the second dynamic event is the extended attribute representation manner, and create an extended attribute table based on the latest information of the second dynamic event, and associate the created extended attribute table with the static layer in the high-definition map, or modify an extended attribute table of the second dynamic event based on the latest information of the second dynamic event.

In a possible implementation, when the dynamic event includes a third dynamic event, the representation unit 603 is further configured to obtain latest information of the third dynamic event, and obtain, from the memory, a representation manner of the third dynamic event, determine that the representation manner of the third dynamic event is the dynamic layer representation manner, and create a dynamic layer based on the latest information of the third dynamic event, or modify, based on the latest information of the third dynamic event, a dynamic layer to which the third dynamic event belongs.

For specific operations of the units in the apparatus 600 shown in FIG. 6 and beneficial effects, refer to the descriptions in the method and the possible implementations of the method in FIG. 2. Details are not described herein again.

Figure 7:
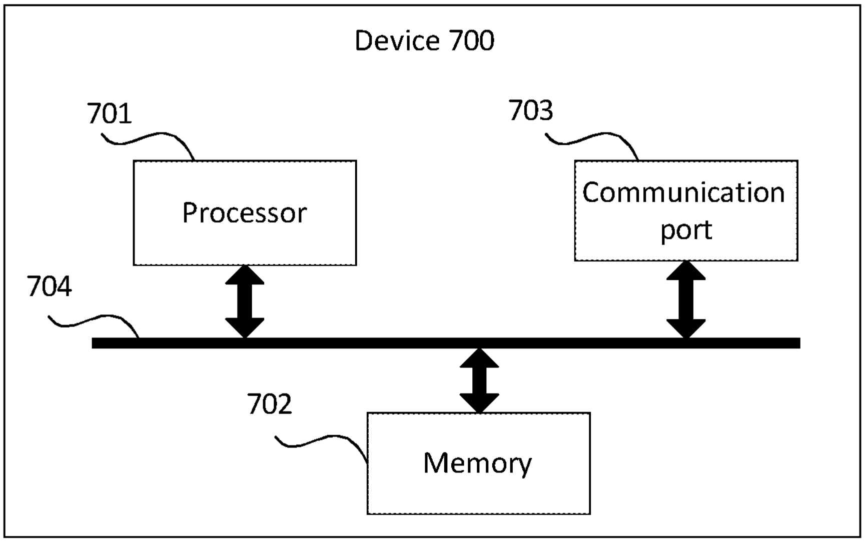
FIG. 7 is a schematic diagram of a hardware structure of a device according to an embodiment of this disclosure.

FIG. 7 is a schematic diagram of a possible hardware structure of a device according to this disclosure. The device may be the map update apparatus in the method in the foregoing embodiments. The device 700 includes a processor 701, a memory 702, and a communication port 703. The processor 701, the communication port 703, and the memory 702 may be connected to each other or connected to each other by using a bus 704.

For example, the memory 702 is configured to store a computer program and data of the device 700. The memory 702 may include but is not limited to a random-access memory (RAM), a read-only memory (ROM), an erasable programmable ROM (EPROM), a portable ROM (e.g., compact disc (CD) ROM (CD-ROM)), and the like.

When the embodiment shown in FIG. 7 is implemented, software or program code used for performing functions of all or some units in FIG. 7 is stored in the memory 702.

In the case of implementing the embodiment in FIG. 7, if software or program code used by functions of some units is stored in the memory 702, the processor 701, in addition to invoking the program code in the memory 702 to implement some functions, may cooperate with another component (for example, the communication port 703) to jointly complete another function (for example, a data receiving function) described in the embodiment in FIG. 7.

There may be a plurality of communication ports 703 that are configured to support the device 700 in performing communication, for example, receiving or sending data or a signal.

For example, the processor 701 may be a central processing unit, a general-purpose processor, a digital signal processor, an application-specific integrated circuit (ASIC), a field-programmable gate array (FPGA) or another programmable logic device, a transistor logic device, a hardware component, or any combination thereof. Alternatively, the processor may be a combination of processors implementing a computing function, for example, a combination of one or more microprocessors, or a combination of the digital signal processor and a microprocessor. The processor 701 may be configured to read the program stored in the memory 702, and perform the method in FIG. 2 and the method in the possible implementation. For example, the processor 701 may perform the following operations: obtaining n-dimensional feature information of a dynamic event in n dimensions, where the n dimensions are n factors that affect representation of the dynamic event in a high-definition map, the dynamic event is an event that causes dynamic information in the high-definition map to change, and n is an integer greater than one, where the obtaining operation may be the operation in step S201 shown in FIG. 2, determining, based on the n-dimensional feature information, a representation manner of the dynamic event in the high-definition map, where the determining operation may be the operation in step S202 shown in FIG. 2, and representing the dynamic event in the high-definition map based on the determined representation manner of the dynamic event, where the representing operation may be the operation in step S203 shown in FIG. 2.

For specific operations executed by the device 700 shown in FIG. 7 and beneficial effects, refer to the descriptions in the method and the possible implementations of the method in FIG. 2. Details are not described herein again.

An embodiment of this disclosure further provides an apparatus. The apparatus includes a processor, a communication port, and a memory. The apparatus is configured to perform the method in any one of the foregoing embodiments and the possible embodiments of the foregoing embodiments.

In a possible implementation, the apparatus is a chip or a system on a chip (SoC).

An embodiment of this disclosure further provides a computer-readable storage medium. The computer-readable storage medium stores a computer program. The computer program is executed by a processor to implement the method in any one of the foregoing embodiments and the possible embodiments of the foregoing embodiments.

An embodiment of this disclosure further provides a computer program product. When the computer program product is read and executed by a computer, the method in any one of the foregoing embodiments and the possible embodiments of the foregoing embodiments is performed.

An embodiment of this disclosure further provides a computer program. When the computer program is executed on a computer, the computer is enabled to implement the method in any one of the foregoing embodiments and the possible embodiments of the foregoing embodiments.

An embodiment of this disclosure further provides a high-definition map. The high-definition map includes a static layer and/or a dynamic layer for presenting dynamic information. A representation manner of the dynamic information in the static layer and/or the dynamic layer is determined by the high-definition map update method in any one of the foregoing embodiments and the possible embodiments of the foregoing embodiments.

In conclusion, in this disclosure, the representation manner of the dynamic event in the high-definition map is evaluated from a plurality of dimensions, so that a representation manner of each dynamic event can be accurately determined, and automatic processing is easily implemented. Compared with the conventional technology, this disclosure provides a feasible and efficient high-definition map update method. Thus, event representation of the high-definition map can be improved, and accuracy and automation of the event representation of the high-definition map are improved.

In this disclosure, terms such as "first" and "second" are used to distinguish same items or similar items that have basically same effects and functions. It should be understood that there is no logical or time sequence dependency between "first", "second", and "n$^{th}$". A quantity and an execution sequence are not limited. It should also be understood that although terms such as "first" and "second" are used in the following descriptions to describe various elements, these elements should not be limited by the terms. These terms are merely used to distinguish one element from another element. For example, without departing from the scope of the various examples, a first image may be referred to as a second image, and similarly, a second image may be referred to as a first image. Both the first image and the second image may be images, and in some cases, may be separate and different images.

It should be further understood that sequence numbers of processes do not mean execution sequences in embodiments of this disclosure. The execution sequences of the processes should be determined based on functions and internal logic of the processes, and should not be construed as any limitation on the implementation processes of embodiments of this disclosure.

It should be further understood that the term "include" (or "includes", "including", "comprises", and/or "comprising") used in this specification specifies presence of the stated features, integers, steps, operations, elements, and/or components, with presence or addition of one or more other features, integers, steps, operations, elements, components, and/or their components not excluded.

It should further be understood that "one embodiment", "an embodiment", or "a possible implementation" mentioned throughout this specification means that particular features, structures, or characteristics related to the embodiments or implementations are included in at least one embodiment of this disclosure. Therefore, "in one embodiment", "in an embodiment", or "in a possible implementation" appearing throughout this specification does not necessarily mean a same embodiment. In addition, these particular features, structures, or characteristics may be combined in one or more embodiments by using any appropriate manner.

Finally, it should be noted that the foregoing embodiments are merely intended for describing the technical solutions of this disclosure other than limiting this disclosure. Although this disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of embodiments of this disclosure.

What is claimed is:

1. A method comprising:

obtaining first n-dimensional feature information of a first dynamic event in n dimensions, wherein the n dimensions are n classification factors that affect a determination of a representation manner of the first dynamic event in a high-definition map, wherein the first dynamic event causes dynamic information in the high-definition map to change, wherein the n classification factors comprise at least two of:
- an update frequency of a dynamic event status,
- an occurrence probability of an event,
- a degree of impact of the event on a topology of the high-definition map,
- a degree of an association change of the event,
- a reusability of geometric representation of the event for a static layer, or
- a degree of independence of the event from the static layer, and wherein n is an integer greater than one;

determining, based on the first n-dimensional feature information, a first representation manner of the first dynamic event in the high-definition map, wherein the first representation manner comprises:
- an extended attribute representation manner comprising associating the first dynamic event with a static layer in the high-definition map and setting the first dynamic event as an extended attribute of a static layer element, wherein the static layer comprises map elements including static road infrastructure; or
- a dynamic layer representation manner comprising a result of adding the first dynamic event to a first dynamic layer in the high-definition map, wherein the first dynamic layer is separate from the static layer and comprises dynamic events that are less dependent on the static road infrastructure; and updating the first dynamic event in the high-definition map based on the first representation manner.

2. The method of claim 1, wherein when the first dynamic event comprises a plurality of second dynamic events, the method further comprises:

obtaining second n-dimensional feature information of the second dynamic events; and determining, based on the second n-dimensional feature information and using a clustering algorithm, second representation manners of the second dynamic events in the high-definition map, wherein each second representation manner is one of the extended attribute representation manner or the dynamic layer representation manner.

3. The method of claim 2, further comprising:

classifying, using the clustering algorithm, the second dynamic events to obtain a first-type dynamic event and a second-type dynamic event;

determining, through analysis based on third n-dimensional feature information of the first-type dynamic event and fourth n-dimensional feature information of the second-type dynamic event, that a first degree of association between the first-type dynamic event and the static layer in the high-definition map is greater than a second degree of association between the second-type dynamic event and the static layer;

classifying, in response to determining that the first degree is greater than the second degree, the first-type dynamic event as represented by the extended attribute representation manner; and classifying, in response to determining that the first degree is greater than the second degree, the second-type dynamic event as represented by the dynamic layer representation manner.

4. The method of claim 1, wherein the first dynamic event comprises a second dynamic event, and wherein determining the first representation manner comprises:

determining n determination results, each determination result indicating a respective representation manner of the second dynamic event based on evaluation in a respective dimension of the n dimensions, wherein the n determination results comprise indications that each respective representation manner is the extended attribute representation manner and/or the dynamic layer representation manner; and determining that the first representation manner is the representation manner that accounts for a largest proportion of the n determination results, wherein the representation manner that accounts for the largest proportion is whichever of the extended attribute representation manner or the dynamic layer representation manner appears most frequently among the n determination results.

5. The method of claim 1, wherein after determining the first representation manner, the method further comprises storing the first dynamic event and the first representation manner in a memory.

6. The method of claim 5, wherein the first dynamic event comprises a second dynamic event, and wherein the method further comprises:

obtaining latest information of the second dynamic event;

retrieving from the memory a second representation manner of the second dynamic event, wherein the second representation manner was previously determined and stored for the second dynamic event;

determining that the second representation manner is the extended attribute representation manner;

creating an extended attribute table based on the latest information; and associating the extended attribute table with the static layer in the high-definition map.

7. The method of claim 5, wherein the first dynamic event comprises a third dynamic event, and wherein the method comprises:

obtaining latest information of the third dynamic event;

retrieving from the memory a third representation manner of the third dynamic event, wherein the third representation manner was previously determined and stored for the third dynamic event;

determining that the third representation manner is the dynamic layer representation manner; and creating a second dynamic layer based on the latest information.

8. An apparatus comprising:

at least one memory configured to store instructions; and at least one processor coupled to the at least one memory and configured to execute the instructions to cause the apparatus to:

obtain first n-dimensional feature information of a first dynamic event in n dimensions, wherein the n dimensions are n classification factors that affect a determination of a dynamic representation manner of the first dynamic event in a high-definition map, wherein the first dynamic event causes dynamic information in the high-definition map to change, wherein the n classification factors comprise at least two of:

an update frequency of a dynamic event status, an occurrence probability of an event, a degree of impact of the event on a topology of the high-definition map, a degree of an association change of the event, a reusability of geometric representation of the event for a static layer, or a degree of independence of the event from the static layer, and wherein n is an integer greater than one;

determine, based on the first n-dimensional feature information, a first representation manner of the first dynamic event in the high-definition map, wherein the first representation manner comprises:

an extended attribute representation manner associating the first dynamic event with a static layer in the high-definition map and setting the first dynamic event as an extended attribute of a static layer element, wherein the static layer comprises map elements including static road infrastructure; or a dynamic layer representation manner comprising a result of adding the first dynamic event to a first dynamic layer in the high-definition, wherein the first dynamic layer is separate from the static layer and comprises dynamic events that are less dependent on the static road infrastructure; and update the first dynamic event in the high-definition map based on the first representation manner.

9. The apparatus of claim 8, wherein when the first dynamic event comprises a plurality of second dynamic events, the at least one processor is further configured to execute the instructions to cause the apparatus to:

obtain second n-dimensional feature information of the second dynamic events; and determine, based on the second n-dimensional feature information using a clustering algorithm, second representation manners of the second dynamic events in the high-definition map, wherein each second representation manner is one of the extended attribute representation manner or the dynamic layer representation manner.

10. The apparatus of claim 9, wherein the at least one processor is further configured to execute the instructions to cause the apparatus to:

classify, using the clustering algorithm, the second dynamic events to obtain a first-type dynamic event and a second-type dynamic event;

determine, through analysis based on third n-dimensional feature information of the first-type dynamic event and fourth n-dimensional feature information of the second-type dynamic event, that a first degree of association between the first-type dynamic event and the static layer in the high-definition map is greater than a second degree of association between the second-type dynamic event and the static layer;

classify, in response to determining that the first degree is greater than the second degree, the first-type dynamic event as represented by the extended attribute representation manner; and classify, in response to determining that the first degree is greater than the second degree, the second-type dynamic event as represented by the dynamic layer representation manner.

11. The apparatus of claim 8, wherein the first dynamic event comprises a second dynamic event, and wherein the at least one processor is further configured to execute the instructions to cause the apparatus to:

determine n determination results, each determination result indicating a respective representation manner of the second dynamic event in a respective dimension of the n dimensions, wherein the n determination results comprise indications that each respective representation manner is the extended attribute representation manner or the dynamic layer representation manner; and determine that the first representation manner is the representation manner that accounts for a largest proportion of the determination results, wherein the representation manner that accounts for the largest proportion is whichever of the extended attribute representation manner or the dynamic layer representation manner appears most frequently among the n determination results.

12. The apparatus of claim 8, wherein the at least one processor is further configured to execute the instructions to cause the apparatus to store the first dynamic event and the first representation manner in the memory.

13. The apparatus of claim 12, wherein the first dynamic event comprises a second dynamic event, and wherein the at least one processor is further configured to execute the instructions to cause the apparatus to:

obtain latest information of the second dynamic event;

retrieve from the memory, a second representation manner of the second dynamic event, wherein the second representation manner was previously determined and stored for the second dynamic event;

determine that the second representation manner is the extended attribute representation manner;

create an extended attribute table based on the latest information; and associate the extended attribute table with the static layer in the high-definition map.

14. The apparatus of claim 12, wherein the first dynamic event comprises a third dynamic event, and wherein the at least one processor is further configured to execute the instructions to cause the apparatus to:

obtain latest information of the third dynamic event;

retrieve from the memory, a third representation manner of the third dynamic event, wherein the third representation manner was previously determined and stored for the third dynamic event;

determine that the third representation manner is the dynamic layer representation manner; and create a second dynamic layer based on the latest information or modify an existing dynamic layer based on the latest information.

15. A computer program product comprising instructions stored on a non-transitory medium and that, when executed by a processor, cause an apparatus to:

obtain first n-dimensional feature information of a first dynamic event in n dimensions, wherein the n dimensions are n classification factors that affect a determination of a representation manner of the first dynamic event in a high-definition map, wherein the first dynamic event causes dynamic information in the high-definition map to change, wherein the n classification factors comprise at least two of: an update frequency of a dynamic event status, an occurrence probability of an event, a degree of impact of the event on a topology of the high-definition map, a degree of an association change of the event, a reusability of geometric representation of the event for a static layer, or a degree of independence of the event from the static layer, and wherein n is an integer greater than one;

determine, based on the first n-dimensional feature information, a first representation manner of the first dynamic event in the high-definition map, wherein the first representation manner comprises:

an extended attribute representation manner comprising associating the first dynamic event with the static layer in the high-definition map and setting the first dynamic event as an extended attribute of a static layer element, wherein the static layer comprises map elements including static road infrastructure; or a dynamic layer representation manner comprising a result of adding the first dynamic event to a first dynamic layer in the high-definition map, wherein the first dynamic layer is separate from the static layer and comprises dynamic events that are less dependent on the static road infrastructure; and update the first dynamic event in the high-definition map based on the first representation manner.

16. The computer program product method of claim 15, wherein the first dynamic event comprises a second dynamic event, and wherein the instructions, when executed by the processor, cause the apparatus to:

obtain latest information of the second dynamic event;

retrieve, from the memory, a second representation manner of the second dynamic event, wherein the second representation manner was previously determined and stored for the second dynamic event;

determine that the second representation manner is the extended attribute representation manner; and modify an existing extended attribute table based on the latest information.

17. The method of claim 5, wherein the first dynamic event comprises a fourth dynamic event, and wherein the method comprises:

obtaining latest information of the fourth dynamic event;

retrieving, from the memory, a fourth representation manner of the fourth dynamic event;

determining that the fourth representation manner is the dynamic layer representation manner; and modifying an existing dynamic layer based on the latest information.

18. The apparatus of claim 12, wherein the first dynamic event comprises a fourth dynamic event, and wherein the at least one processor is further configured to execute the instructions to cause the apparatus to:

obtain latest information of the fourth dynamic event;

retrieve, from the memory, a fourth representation manner of the second dynamic event, wherein the fourth representation manner was previously determined and stored for the fourth dynamic event;

determine that the fourth representation manner is the extended attribute representation manner; and modify an existing extended attribute table based on the latest information.

19. The method of claim 1, wherein obtaining first n-dimensional feature information of a first dynamic event comprises receiving information from an external server.

20. The method of claim 2, wherein the clustering algorithm comprises a K-Means clustering algorithm.

* * * * *